United States Patent [19]

Suzuki

[11] 4,442,367
[45] Apr. 10, 1984

[54] ELASTOMERIC MEMBER FOR SUSPENDING A MOTOR WHILE POSITIONING ITS MAGNET

[75] Inventor: Tadashi Suzuki, Kakuda, Japan
[73] Assignee: Alps Electric Co., Ltd., Tokyo, Japan
[21] Appl. No.: 405,324
[22] Filed: Aug. 5, 1982
[30] Foreign Application Priority Data Aug. 6, 1981 [JP] Japan ............ 56-117271[U]

[51] Int. Cl.³ .................................. H02K 5/24
[52] U.S. Cl. ......................... 310/91; 248/632
[58] Field of Search ............ 310/51, 89, 91; 248/632, 634

[56] References Cited

U.S. PATENT DOCUMENTS 1,293,622  2/1919  Roberts .................... 310/51
2,442,754  6/1948  Beam ....................... 248/634
4,079,277  3/1978  Osanai ..................... 310/90

FOREIGN PATENT DOCUMENTS 462219  1/1950  Canada .................... 248/632

*Primary Examiner*—J. D. Miller
*Assistant Examiner*—D. L. Rebsch
*Attorney, Agent, or Firm*—Guy W. Shoup; Gerard F. Dunne

[57] ABSTRACT

A support for a motor wherein the motor is held on a chassis of a tape recorder or the like by the use of mounting members made of rubber or the like material, characterized in that each of the mounting members is provided with two constricted portions, one of which is inserted into a hole provided in the chassis and the other of which is inserted into a hole provided in the motor. The mounting members also position the motor with respect to the mounting holes.

1 Claim, 3 Drawing Figures

ELASTOMERIC MEMBER FOR SUSPENDING A MOTOR WHILE POSITIONING ITS MAGNET

BACKGROUND OF THE INVENTION

The present invention relates to a member for holding a motor on the chassis of a tape recorder or the like.

Heretofore, a member or support of the specified type for holding a motor has been constructed as shown in FIG. 1. In holes 10a provided in the chassis 10 of a tape recorder or the like, there are installed mounting members which are made of rubber and each of which has a single constricted portion 12a. A collar 13 is inserted into an aperture 12b provided in the mounting member 12, and a mounting screw 15 is threadably fitted in the tapped hole of the case 2 through a washer 14. Thus, the motor 1 is held on the chassis 10.

In the prior-art support, however, the four components (mounting member 12, washer 14, collar 13 and mounting screw 15) are used for one mounting position of the motor 1, so that the number of assembly steps is large. Another disadvantage is that the rubber part between the chassis 10 and the washer 14 is compressed by the weight of the motor 1 itself, so the vibration of the motor is prone to be transmitted to the chassis 10 through the mounting screw 15 as well as the washer 14.

SUMMARY OF THE INVENTION

The present invention has been made in view of the disadvantages of the prior art, and has for its object to provide a motor-holding support which holds a motor on a chassis with a small number of components and which prevents the transmission of vibration caused by the motor.

According to the present invention, a support for holding a motor is characterized in that each of mounting members is provided with two constricted portions, one of which is inserted into a hold provided in a chassis and the other of which is inserted into a hole provided in the motor.

BRIEF DESCRIPTION OF THE DRAWINGS

FIGS. 2 and 3 show a support for holding a motor embodying the present invention, in which FIG. 2 is a sectional view of the support and FIG. 3 is a sectional view of a mounting member in the support.

PREFERRED EMBODIMENT OF THE INVENTION

Figure 1:
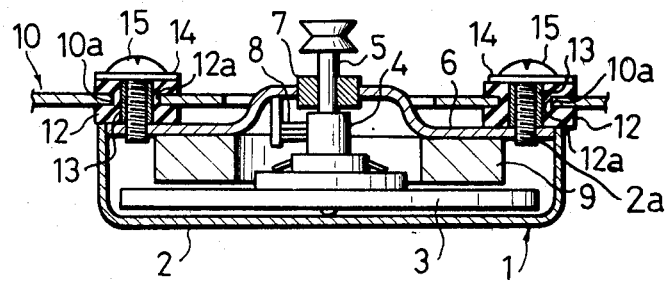
FIG. 1 is a sectional view showing a prior-art support for holding a motor.
Figure 2:
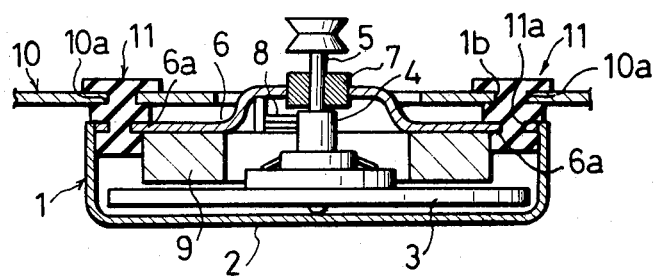
Figure 3:
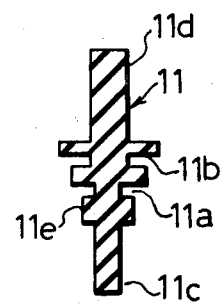

Hereunder, an embodiment of the present invention will be described with reference to FIGS. 2 and 3.

Numeral 1 designates a motor. It has a substantially cup-shaped case 2, in which a rotor shaft 5 furnished with a rotor 3, a commutator 4, etc. is rotatably disposed. Numeral 6 designates a bracket which closes the open end of the case 2, and which is provided with a bearing 7 for the rotor shaft 5 and a brush 8 lying in touch with the commutator 4. The bracket 6 is formed with a plurality of holes 6a at predetermined intervals. Shown at numeral 9 is a doughnut-shaped permanent magnet which is fastened to the bracket 6. The chassis 10 of a tape recorder or the like is formed with a number of holes 10a equal to the number of the holes 6a of the bracket 6, in positions opposing the holes of the bracket. The motor holding support includes mounting members 11 which are made of an elastomeric material. Each mounting member 11 is formed with first and second constricted portions 11a and 11b. Before mounting, it has pulling portions 11c and 11d at both its ends and a protrusion 11e adjacent to the constricted portion 11a as illustrated in FIG. 3.

The motor 1 is mounted onto the chassis 10 by utilizing the mounting members 11. More specifically, first of all, the pulling portion 11c of each mounting member 11 is inserted into the hole 6a of the bracket 6, and this pulling portion 11c is pulled downwardly. Thus, the first constricted portions 11a of the mounting member 11 receives the edges of the hole 6a to hold the bracket 6. Thereafter, the pulling portion 11c of each mounting member is cut away because it is no longer necessary. Under this state, the permanent magnet 9 is installed on the bracket 6 by utilizing the protrusions 11e of the mounting members 11 for the positioning of the outer periphery of the permanent magnet, and the resultant bracket 6 is installed on the case 2. Then, the motor 1 is assembled. Subsequently, the opposite pulling portions 11d of the mounting members 11 are inserted into the respective holes 10a of the chassis 10 and are pulled upwardly and the second constricted portions 11b of the mounting members 11 receives the edges of the hole 10a to hold the part of the chassis 10 facing the bracket 6. Thereafter, the pulling portion 11d is no longer necessary and is cut away. Via the above steps, the first and second constricted portions 11a and 11b are respectively inserted into the holes 6a and 10a of the motor 1 and the chassis 10, whereby the motor 1 is held on the chassis 10 by only the mounting member 11. Moreover, since the mounting member 11 is placed under tension the weight of the motor 1 itself, the vibration of the motor is difficult to be transmitted to the chassis 10, and a remarkable vibration-proof effect can be achieved.

As set forth above, according to the present invention, each of the mounting members 11 made of the rubbery material is provided with the two constricted portions 11a and 11b, one of which is inserted into the hole 10a provided in the chassis 10 and the other of which is inserted into the hole 6a of the motor 1. Unlike the prior art, therefore, the four components are not required for each mounting portion, so that the number of components can be reduced, the assembly operations can be simplified and the cost can be reduced. In addition, the vibration of the motor becomes more isolated from the chassis.

I claim:

1. A member for suspending a motor from a chassis of a tape recorder or the like, comprising a support member formed of elastomeric material and having a first constricted portion of a reduced diameter adapted to fit tightly within an opening of said chassis and a second constricted portion of a reduced diameter adapted to fit tightly within an opening of a frame member supporting said motor, said member including means formed by an enlarged portion adapted to abut the lateral side surface of a permanent magnet of said motor for aligning the permanent magnet of said motor by positioning a plurality of said members in spaced relation around the lateral side surface thereof.

* * * * *